United States Patent
Eiletz et al.

(10) Patent No.: US 8,714,074 B2
(45) Date of Patent: May 6, 2014

(54) LENGTH-ADJUSTABLE PISTON CYLINDER UNIT COMPRISING A SAFETY DEVICE

(75) Inventors: Christian Eiletz, Altdorf (DE); Gerhard Wunderling, Pegnitz (DE)

(73) Assignee: Suspa GmbH, Altdorf (DE)

( * ) Notice: Subject to any disclaimer, the term of this patent is extended or adjusted under 35 U.S.C. 154(b) by 753 days.

(21) Appl. No.: 12/963,885

(22) Filed: Dec. 9, 2010

(65) Prior Publication Data
US 2011/0132186 A1 Jun. 9, 2011

(30) Foreign Application Priority Data
Dec. 9, 2009 (DE) .......................... 10 2009 047 748

(51) Int. Cl.
*F16J 1/00* (2006.01)

(52) U.S. Cl.
USPC ................................. 92/18; 92/23; 267/64.12

(58) Field of Classification Search
USPC ..................... 92/18, 22, 23, 24, 26; 267/64.12
See application file for complete search history.

(56) References Cited

U.S. PATENT DOCUMENTS

| | | | | |
|---|---|---|---|---|
| 4,078,779 A * | 3/1978 | Molders | ........................ | 267/120 |
| 4,449,702 A * | 5/1984 | Hasegawa | ................... | 267/64.12 |
| 5,443,573 A * | 8/1995 | Thiele et al. | ................. | 267/64.12 |
| 5,462,248 A * | 10/1995 | Bauer | ............................ | 248/161 |
| 5,634,534 A * | 6/1997 | Kanai et al. | ..................... | 188/67 |
| 5,950,997 A * | 9/1999 | Metz | ............................... | 267/255 |
| 6,135,434 A * | 10/2000 | Marking | .................... | 267/64.26 |
| 6,736,380 B2 * | 5/2004 | Knapp | ......................... | 267/64.12 |
| 6,866,238 B2 * | 3/2005 | Enders et al. | .................. | 248/599 |
| 6,964,411 B2 * | 11/2005 | Pooschen | ................... | 267/64.11 |
| 2002/0017748 A1 * | 2/2002 | Sander et al. | ............... | 267/64.12 |
| 2004/0173954 A1 | 9/2004 | Pooschen | | |
| 2007/0187198 A1 | 8/2007 | Born et al. | | |

FOREIGN PATENT DOCUMENTS

| | | |
|---|---|---|
| DE | 10 2006 006091 A1 | 9/2007 |
| EP | 1 440 633 B1 | 8/2005 |

* cited by examiner

*Primary Examiner* — Thomas E Lazo
(74) *Attorney, Agent, or Firm* — Browdy and Neimark, PLLC

(57) ABSTRACT

A length-adjustable piston cylinder unit comprises a casing; a guide and sealing unit; a piston rod; a piston; a first interior portion; a second interior portion which faces away from the first interior portion; an adjustment valve; a guide sleeve which is arranged for displacement on the casing, the guide sleeve being secured to the piston rod at a sleeve end and comprising at least one latch opening which is spaced from the sleeve end along the central longitudinal axis; and a latch sleeve arranged on the guide sleeve, the latch sleeve comprising a latch protrusion for engagement into the latch opening, with the latch protrusion of the latch sleeve being arrangeMc in the latch opening of the guide sleeve for arranging the piston cylinder unit in a secured position so that the displaccability of the guide sleeve connected with the piston rod relative to the casing is blocked.

17 Claims, 4 Drawing Sheets

LENGTH-ADJUSTABLE PISTON CYLINDER UNIT COMPRISING A SAFETY DEVICE

BACKGROUND OF THE INVENTION

1. Field of the Invention

The invention relates to a length-adjustable piston cylinder unit and to a safety device of a piston cylinder unit of this type.

2. Background Art

A large number of length-adjustable piston cylinder units of this type are known which comprise a casing filled with a fluid and which are operable from outside. These piston cylinder units are for example used for angle adjustment of a backrest of a seat such as a passenger seat for an aircraft. By actuating a release lever or a release button at the seat, an operator is able to randomly select and adjust the angle of the backrest within a defined angular range. A drawback is that when the piston cylinder unit fails, for example in the event of an accidental escape of the fluid from the casing, the piston cylinder unit is no longer operable, and consequently, no longer adjustable.

In the example of the passenger seat in an aircraft, the failure of the piston cylinder unit may become noticeable for example when the backrest to be adjusted using the piston cylinder unit drops into a horizontal position without being damped. In this case, passengers are on the one hand no longer allowed to use the seat for safety reasons; on the other hand, they cannot be expected to use the seat for reasons of comfort. Moreover, the vibrations occurring in the normal operation of the aircraft may cause disturbing rattling noises in the pressure-relieved, in other words pressure-less piston cylinder unit.

SUMMARY OF THE INVENTION

It is therefore the object of the invention to provide a length-adjustable piston cylinder unit and a safety device of such a piston cylinder unit allowing the piston cylinder unit to be used safely even in the event of a failure. This object is achieved according to the invention by a length-adjustable piston cylinder unit comprising a casing which is filled with a fluid and has a central longitudinal axis; a guide and sealing unit which seals the casing at a first end; a piston rod which is guided through the guide and sealing unit out of the first end of the casing in a sealed manner; a piston which is connected with the piston rod and is guided in the casing in a sealed manner; a first interior portion which is bounded between the piston and the guide and sealing unit; a second interior portion which is bounded by the piston and faces away from the first interior portion; an adjustment valve arranged in the piston for optionally connecting the two interior portions with each other; a guide sleeve which is arranged for displacement on the casing and is concentric to the central longitudinal axis, the guide sleeve being secured to the piston rod at a sleeve end and comprising at least one latch opening which is spaced from the sleeve end along the central longitudinal axis; and a latch sleeve arranged on the guide sleeve, the latch sleeve comprising at least one latch protrusion for engagement into the at least one latch opening, with the at least one latch protrusion of the latch sleeve being arrangeable in the at least one latch opening of the guide sleeve for arranging the piston cylinder unit in a secured position so that the displaceability of the guide sleeve connected with the piston rod relative to the casing is blocked. This object is further achieved by a safety device for a piston cylinder unit according to the invention, the safety device comprising the guide sleeve which is arrangeable for displacement along the central longitudinal axis on a casing of the piston cylinder unit, the guide sleeve being securable to the piston cylinder unit with its sleeve end and comprising at least one latch opening which is spaced from the sleeve end along the central longitudinal axis; and the latch sleeve which is arranged on the guide sleeve and comprises at least one latch protrusion for engagement into the at least one latch opening, with the at least one latch protrusion of the latch sleeve being arrangeable in the at least one latch opening of the guide sleeve in order to arrange the safety device in a secured position so that a length adjustment of the guide sleeve connected with the piston cylinder unit is blocked. To this end, the piston cylinder unit comprises a guide sleeve which is arranged for displacement on the casing of the piston cylinder unit and comprises at least one latch opening spaced from a sleeve end of the guide sleeve along a central longitudinal axis of the piston cylinder unit, the sleeve end being secured to a piston rod of the piston cylinder unit, and a latch sleeve arranged on the guide sleeve, the latch sleeve comprising at least one latch protrusion for engagement into the at least one latch opening. The piston cylinder unit may thus be arranged in a safe position, with the at least one latch protrusion of the latch sleeve being arrangeable in the at least one latch opening of the guide sleeve such that the displaceability of the guide sleeve, which is connected with the piston rod, is blocked relative to the casing. In the event of a fluid escape, the pressure-less piston cylinder unit is thus mechanically secured when the piston rod is extended. Securing the piston cylinder unit may occur on the outside by means of the piston cylinder unit, thus allowing the pressure-less piston cylinder unit to be used temporarily until this unit can be replaced. A piston cylinder unit, which is known per se and is already in use, can be retrofitted with the guide sleeve comprising the latch sleeve as safety device, thus ensuring an uncomplicated and cost-effective use of the inventive piston cylinder unit.

Further features, advantages and details of the invention will become apparent from the ensuing description of an embodiment by means of the drawing.

DESCRIPTION OF THE PREFERRED EMBODIMENT

Figure 1:
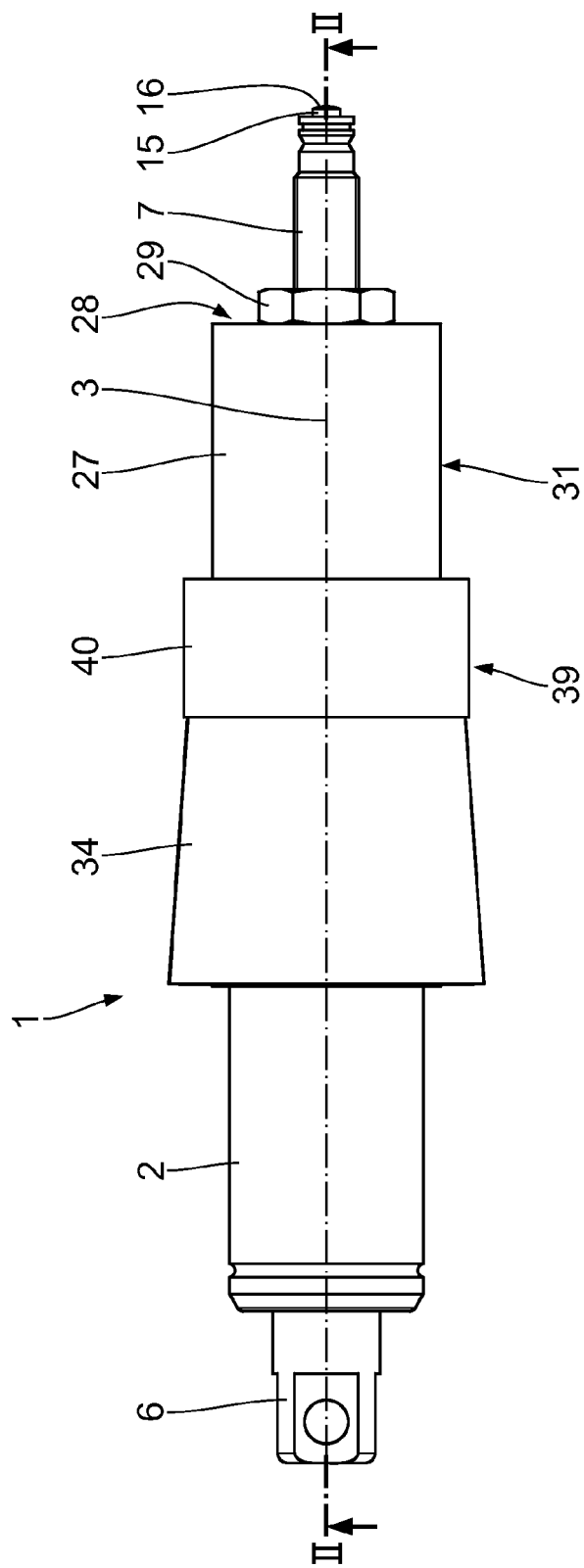
FIG. 1 is a side view of an inventive piston cylinder unit in an unsecured position.
Figure 2:
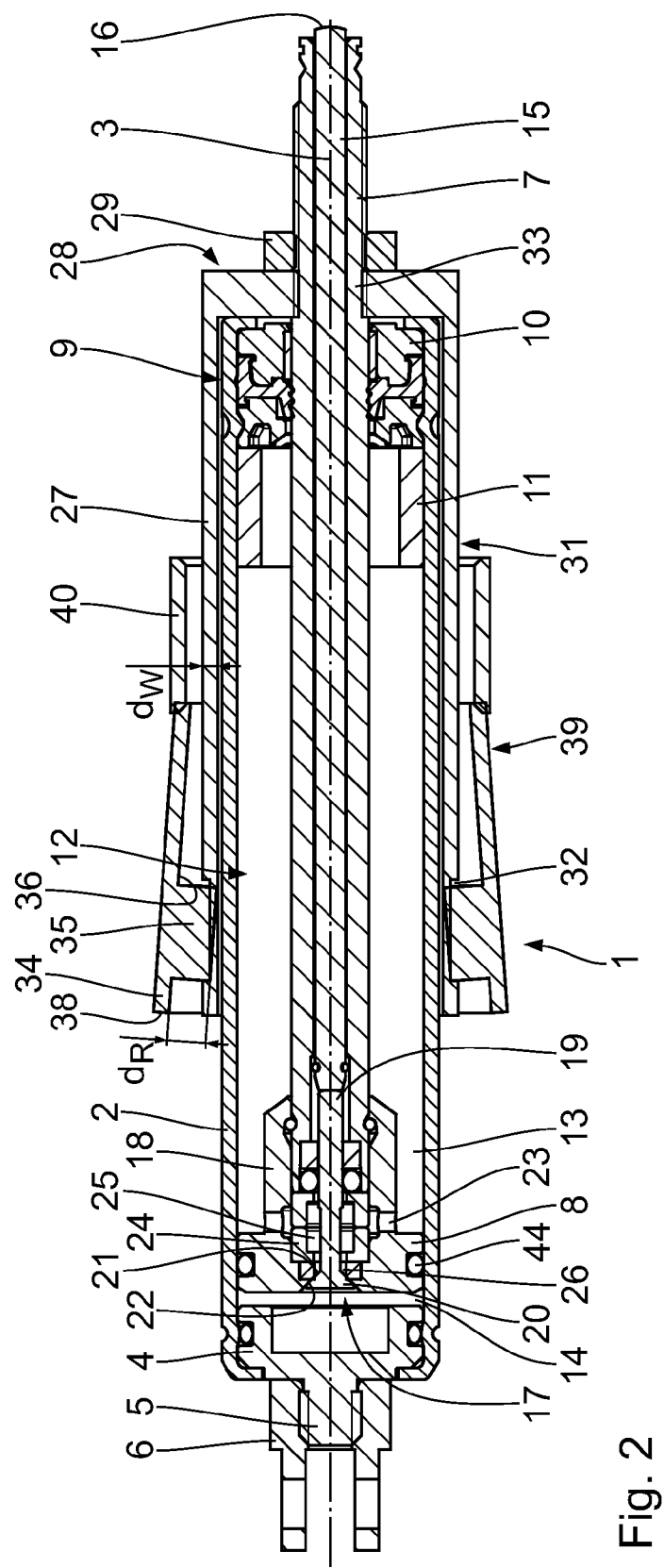
FIG. 2 is a longitudinal section along line II-II in FIG. 1.

The length-adjustable piston cylinder unit 1 shown in FIGS. 1 and 2 comprises a cylindrical casing 2 with a central longitudinal axis 3. The casing 2 is filled with a fluid, in particular a gas, and is sealed in a gas-tight and liquid-tight manner at a second end by means of a bottom 4. On the outside of the bottom 4, a mounting member formed by a threaded pin 5 is provided to which is screwed a connection member in the form of a lug 6. In the casing 2, a piston 8 is arranged which is attached to a piston rod 7. The piston rod 7 is tubular, in other words hollow. In the piston rod 7, an actuator rod 15 is arranged which is displaceable from the outer end along the central longitudinal axis 3. At the outer end, an actuator end 16 of the actuator rod 15 projects beyond the piston rod 7. Furthermore, the piston rod 7 is guided out of the casing 2 of the piston cylinder unit 1 via a guide and sealing unit 10 arranged at a first end 9 of the casing 2. The guide and sealing unit 10 is sealed relative to the casing 2 and relative to the piston rod 7 in the usual manner. Furthermore, a spacer 11 is provided between the piston 8 and the guide and sealing unit 10 which ensures that a predetermined distance is maintained between the piston 8 and the guide and sealing unit 10. A cylinder interior 12 is bounded by the casing 2, the bottom 4 and the guide and sealing unit 10, the cylinder interior 12 being divided into a first interior portion 13 and a second interior portion 14. The first interior portion 13 is arranged between the piston 8 and the guide and sealing unit 10 while the second interior portion 14 is arranged between the piston 8 and the bottom 4. The piston 8 is guided in the casing 2 in a sealed manner by means of a circumferential annular seal 44.

The piston 8 is provided with an adjustment valve 17 which comprises an approximately tubular valve casing 18. In the valve casing 18, a valve pin 19 is arranged for displacement along the central longitudinal axis 3. One end of the valve pin 19 is associated to the actuator rod 15 by which it is actuable. At another end of the valve pin 19 is arranged a valve plate 20. The valve plate 20 is characterized by a radially protruding collar which tapers along the central longitudinal axis 3 in the direction of the actuator rod 15. The conical circumferential surface formed by the valve plate 20 forms a sealing seat 21 which cooperates with a sealing contact surface 22 formed in the piston 8 as a surface corresponding to the sealing seat 21. When the sealing seat 21 of the valve plate 20 abuts the sealing surface 22 of the piston 8, the first interior portion is thus sealed in a gas-tight and liquid-tight manner relative to the second interior portion 14.

Furthermore, the valve casing 18 comprises two flow channels 23 which are arranged radially with respect to the central longitudinal axis 3 and connect the first interior portion 13 with a piston interior 25 bounded by two half shells 24. The piston interior 25 is connected with the second interior portion 14 via a through-channel 26 extending along the central longitudinal axis 3. Along the central longitudinal axis 3, the two half shells 24 abut the piston rod 7 and are sealed relative to said piston rod 7 in the usual manner. Furthermore, the piston rod 7 is also sealed relative to the valve casing 18 in which the piston rod 7 is partially arranged. The valve pin 19 is guided through corresponding openings in the half shells 24 and through the through-channel 26.

A guide sleeve 27 is arranged concentrically to the central longitudinal axis 3 for displacement along the casing 2, with a sleeve end 28 of the guide sleeve 27 being screw-fastened to the piston rod 7 where it is secured by means of a guide nut 29, and with the guide sleeve 27 comprising two latch openings 30 which are spaced from the sleeve end 28 along the central longitudinal axis 3. The latch openings 30 are arranged in a groove 32 arranged on the circumference of an outer circumferential surface 31 of the guide sleeve 27. The latch openings 30 are arranged diametrically with respect to the central longitudinal axis 3. It is conceivable to provide only one or more than two latch openings. A threaded bore 33 is provided on the sleeve end 28 for screw-fastening the guide sleeve 27 to the piston rod 7. The piston rod 7 is provided with a corresponding external thread at least in a portion provided to this end. The guide sleeve 27 is made of a high-strength aluminum alloy, thus providing high strength and stiffness at a low weight.

On the guide sleeve 27 is arranged a latch sleeve 34 which comprises two latch protrusions 35. The latch protrusions 35 are provided for engagement into the latch openings 30 of the guide sleeve 27 and are formed in one piece with an internal wall 36 of the latch sleeve 34. In the position of the piston cylinder unit shown in FIGS. 1 and 2, the latch protrusions 35 of the latch sleeve 34 are arranged in the groove 32 but not in the latch openings 30 of the guide sleeve 27. An internal diameter, bounded by the latch protrusions 35, of the latch sleeve 34 is smaller than an external diameter, bounded by the groove 32, of the guide sleeve 27 so the latch sleeve 34 is elastically expanded in a radially outward direction, with the result that in the illustrated arrangement of the piston cylinder unit 1 the latch sleeve 34 has a conical outer shape. In this arrangement, the piston cylinder unit 1 is pre-mounted but not secured.

The latch sleeve 34 comprises a longitudinal slit 37 which is parallel to the central longitudinal axis 3 and allows the latch sleeve 34 to expand. The stability of the latch sleeve 34 may be increased by bridging at least part of the longitudinal slit 37 with a film connection. Furthermore, the latch sleeve 34 may comprise one or several inwardly protruding stops arranged on a front side 38 facing the latch protrusions 35 for axially securing the latch sleeve 34 to the guide sleeve 27. Arranging the latch protrusions 35 of the latch sleeve 34 in the groove 32 of the guide sleeve 27 ensures that the latch sleeve 34 is prestressed and therefore securely mounted on the guide sleeve 27. With respect to the central longitudinal axis 3, the latch protrusions 35 have a radial thickness $d_R$ which is greater than a wall thickness $d_W$ of the guide sleeve 27. The latch sleeve 34 is made of a high-strength plastic material which may be reinforced using glass fibers, glass spheres and/or aramid fibers. The latch sleeve 34 may in particular be an off-tool injection-molded part.

A safety device 39 of the piston cylinder unit 1 comprises the guide sleeve 27 and the latch sleeve 34 arranged on the guide sleeve 27.

A locking ring 40 is also concentrically arranged on the guide sleeve 27, the locking ring 40 allowing the latch sleeve 34 latched with the guide sleeve 27 to be locked in place. The function of the locking ring 40 will be explained in more detail below by means of FIGS. 3 and 4. The locking ring 40 is made of a high-strength aluminum alloy or of a high-strength plastic material which is in particular reinforced using glass fibers, glass spheres and/or aramid fibers. The locking ring 40 is furthermore provided with a groove or a protrusion allowing the locking ring 40 to be prelatched, and therefore mounted together with the latch sleeve 34 so as to ensure a secure and clearance-free snap-in connection with no rattling noises. The following is a short description of the mode of operation of the piston cylinder unit 1. In the non-secured position of the piston cylinder unit 1 shown in FIGS. 1 and 2, the sealing seat 21 of the valve plate 20 abuts the sealing surface 22 of the piston so that the adjustment valve 17 is closed. The two interior portions 13 and 14 are thus sealed against each other. Since no fluid flow can occur between the two interior portions 13 and 14, the piston 8 cannot be moved along the central longitudinal axis 3. When the actuator end 16 of the actuator rod 15 is actuated for instance by means of a release lever or a release button, the actuator rod 15 is pushed in the direction of the cylinder interior 12. The valve pin 19 is actuated by the actuator rod 15 such that the sealing seat 21 of the valve plate 20 is lifted off the sealing surface 22 of the piston 8. This provides a connection between the first interior portion 13 and the piston interior 25 via the flow channels 23, and between the piston interior 25 and the second interior portion 14 via the through-channel 26, with the result that the piston 8 is displaceable in the casing 2 along the central longitudinal axis 3.

When the piston 8 is axially displaced, the piston rod 7 connected with the piston 8 is displaced together with the guide sleeve 27 which is screwed to the piston rod 7.

Figure 3:
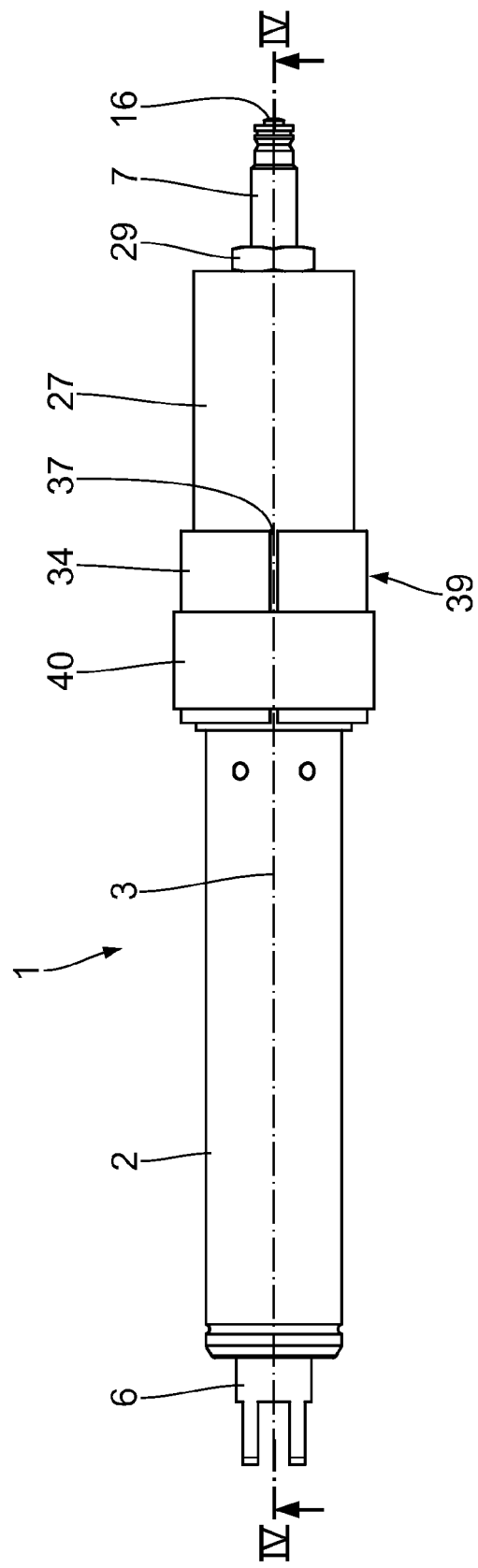
FIG. 3 is a side view corresponding to FIG. 1 in a secured position of the piston cylinder unit.
Figure 4:
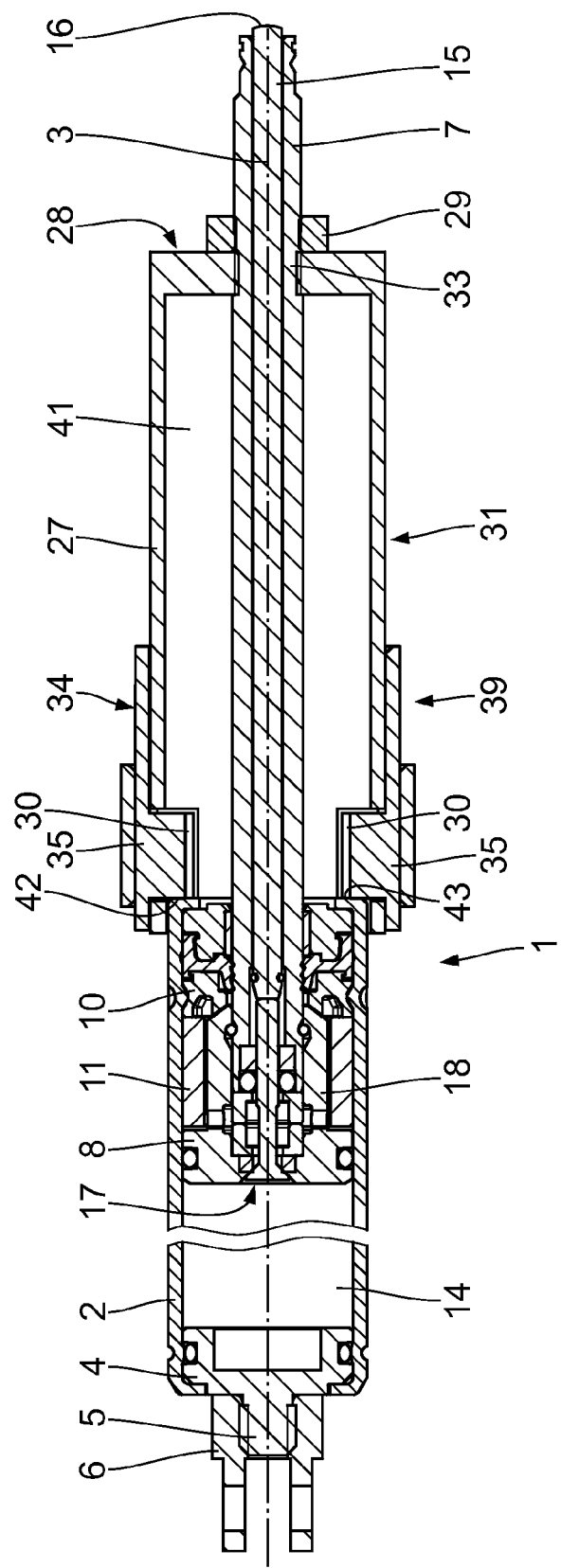
FIG. 4 is a longitudinal section along line IV-IV in FIG. 3.

In the illustrations of FIGS. 3 and 4, the piston cylinder unit 1 is maximally extended. The piston 8 is thus disposed inside the cylinder interior 12 of the casing 2 in an extreme right position which is bounded by the valve casing 18 being arranged within the spacer 11 and on the guide and sealing unit 10. In the event of a pressure-less piston cylinder unit 1 as a result of a fluid escape, such a position of the piston cylinder unit 1 may also be achieved by manually actuating the guide sleeve 27 from outside without actuating the actuator end 16 of the actuator rod 15. In this position, a seat, for example, which is actuable by the piston cylinder unit is in an upright position.

In the event of a pressure-less piston cylinder unit 1, the guide sleeve 27 may be moved to a maximally extended position together with the piston rod 7 and the piston 8. In this position, the latch sleeve 34 arranged on the guide sleeve 27 may be rotated relative to the guide sleeve 27 by rotation about the central longitudinal axis 3. The latch sleeve 34 is rotated until the latch protrusions 35 of the latch sleeve 34 latch into the latch openings 30 of the guide sleeve 27 such as to be arranged therein. The radial thickness $d_R$ of the latch protrusions 35 is greater than the wall thickness $d_W$ of the guide sleeve 27 so the latch protrusions 35 protrude into a hollow space 41 bounded by the guide sleeve 27 and the first end 9 of the casing 2 with the guide and sealing unit 10. In this arrangement, side surfaces 42 of the latch protrusions 35 abut an outer ring-shaped front surface 43 of the first end 9 of the casing 2 so that a movement of the guide sleeve 27 back on the casing 2 of the piston cylinder unit 1 is blocked and therefore impossible. An axial displacement of the guide sleeve 27 in an opposite direction, i.e. away from the guide sleeve 27, is not possible either as the valve casing 18 of the piston 8 abuts the guide and sealing unit 10 in the cylinder interior 12. In the position shown in FIGS. 3 and 4, the piston cylinder unit 1 is therefore in a blocked and secured position.

The latch sleeve 34 latched inside the guide sleeve 27 is locked in place by axially displacing the locking ring 40 along the central longitudinal axis 3 from the guide sleeve 27 onto the latch sleeve 34, thus preventing the latch protrusions 35 of the latch sleeve 34 from being accidentally released from the latch openings 30. In this secured and locked position, the piston cylinder unit 1 may be used temporarily until it is replaced. The locked piston cylinder unit 1 may in particular be exposed to maximum loads between 6000 and 9000 N.

What is claimed is:
1. A length-adjustable piston cylinder unit comprising
 a. a casing (2) which is filled with a fluid and has a central longitudinal axis (3);
 b. a guide and sealing unit (10) which seals the casing (2) at a first end (9);
 c. a piston rod (7) which is guided through the guide and sealing unit (10) out of the first end (9) of the casing (2) in a sealed manner;
 d. a piston (8) which is connected with the piston rod (7) and is guided in the casing (2) in a sealed manner;
 e. a first interior portion (13) which is bounded between the piston (8) and the guide and sealing unit (10);
 f. a second interior portion (14) which is bounded by the piston (8) and faces away from the first interior portion (13);
 g. an adjustment valve (17) arranged in the piston (8) for optionally connecting the two interior portions (13, 14) with each other;
 h. a guide sleeve (27) which is arranged for displacement on the casing (2) and is concentric to the central longitudinal axis (3), the guide sleeve (27)
  i. being secured to the piston rod (7) at a sleeve end (28);
  ii. comprising at least one latch opening (30) which is spaced from the sleeve end (28) along the central longitudinal axis (3); and
 i. a latch sleeve (34) arranged on the guide sleeve (27), the latch sleeve (34) comprising at least one latch protrusion (35) for engagement into the at least one latch opening (30),
 with
 j. the at least one latch protrusion (35) of the latch sleeve (34) being arrangeable in the at least one latch opening (30) of the guide sleeve (27) for arranging the piston cylinder unit (1) in a secured position so that the displaceability of the guide sleeve (27) connected with the piston rod (7) relative to the casing (2) is blocked.

2. A piston cylinder unit according to claim 1, comprising a locking ring (40) which is arranged concentrically on the guide sleeve (27) for locking the latch sleeve (34) latched with the guide sleeve (27).

3. A piston cylinder unit according to claim 1, comprising a groove (32) arranged on the circumference of an outer circumferential surface (31) of the guide sleeve (27).

4. A piston cylinder unit according to claim 3, wherein the at least one latch opening (30) is arranged inside the groove (32).

5. A piston cylinder unit according to claim 1, wherein the at least one latch protrusion (35) is formed on an internal wall (36) of the latch sleeve (34).

6. A piston cylinder unit according to claim 5, wherein relative to the central longitudinal axis (3), the at least one latch protrusion (35) has a radial thickness ($d_R$) which is greater than a wall thickness ($d_W$) of the guide sleeve (27).

7. A piston cylinder unit according to claim 1, wherein the latch sleeve (34) comprises a longitudinal slit (37) which is parallel to the central longitudinal axis (3).

8. A piston cylinder unit according to claim 7, wherein the longitudinal slit (37) is at least partially bridged by means of a film connection.

9. A piston cylinder unit according to claim 1, comprising at least one radially inwardly protruding stop which is arranged on a front side (38) of the latch sleeve (34) for axially securing the latch sleeve (34) on the guide sleeve (27).

10. A piston cylinder unit according to claim 1, wherein the locking ring (40) is arranged on the latch sleeve (34) in a clearance-free manner.

11. A piston cylinder unit according to claim 1, wherein the guide sleeve (27) is made of a high-strength aluminum alloy.

12. A piston cylinder unit according to claim 1, wherein the latch sleeve (34) is made of a high-strength plastic material.

13. A piston cylinder unit according to claim 1, wherein the latch sleeve (34) is made of a high-strength plastic material which is reinforced by one of the group comprising glass fibers, glass spheres and aramid fibers.

14. A piston cylinder unit according to claim 1, wherein the locking ring (40) is made of one of the group comprising a high-strength aluminum alloy and a high-strength plastic material.

15. A piston cylinder unit according to claim 1, wherein the locking ring (40) is made of one of the group comprising a high-strength aluminum alloy and a high-strength plastic material which is reinforced by one of the group comprising glass fibers, glass spheres and aramid fibers.

16. A piston cylinder unit according to claim 1, wherein the adjustment valve (17) comprises
 a. a valve pin (19) which is displaceable in the direction of the central longitudinal axis (3);
 b. a valve plate (20) arranged on the valve pin (19);
 c. a sealing seat (21); and d. a sealing contact surface (22) which cooperates with the sealing seat (21), with the sealing seat (21) and the sealing contact surface (22) being detachable from each other.

17. A safety device for a piston cylinder unit according to the invention, the safety device comprising
- a. the guide sleeve (27) which is arrangeable for displacement along the central longitudinal axis (3) on a casing (2) of the piston cylinder unit (1), the guide sleeve (27)
    - i. being securable to the piston cylinder unit (1) with its sleeve end (28); and
    - ii. comprising at least one latch opening (30) which is spaced from the sleeve end (28) along the central longitudinal axis (3); and
- b. the latch sleeve (34) which is arranged on the guide sleeve (27) and comprises at least one latch protrusion (35) for engagement into the at least one latch opening (30), with
- c. the at least one latch protrusion (35) of the latch sleeve (34) being arrangeable in the at least one latch opening (30) of the guide sleeve (27) in order to arrange the safety device (39) in a secured position so that a length adjustment of the guide sleeve (27) connected with the piston cylinder unit (1) is blocked.

\* \* \* \* \*